(12) United States Patent
Kann (10) Patent No.: US 11,667,058 B2
(45) Date of Patent: *Jun. 6, 2023

(54) UTILIZATION OF FINE MINERAL MATTER IN THE CONVERSION OF NON-BIODEGRADABLE PLASTIC AND IN REMEDIATION OF SOILS POLLUTED WITH NON-BIODEGRADABLE PLASTIC

(71) Applicant: Radical Plastics, Inc., Marblehead, MA (US)

(72) Inventor: Yelena Kann, Marblehead, MA (US)

(73) Assignee: Radical Plastics, Inc., Marblehead, MA (US)

( * ) Notice: Subject to any disclaimer, the term of this patent is extended or adjusted under 35 U.S.C. 154(b) by 200 days.

This patent is subject to a terminal disclaimer.

(21) Appl. No.: 17/024,692

(22) Filed: Sep. 17, 2020

(65) Prior Publication Data

US 2021/0008762 A1 Jan. 14, 2021

Related U.S. Application Data

(63) Continuation-in-part of application No. 16/571,275, filed on Sep. 16, 2019, now Pat. No. 10,906,209, which is a continuation of application No. 16/293,814, filed on Mar. 6, 2019, now Pat. No. 10,549,455.

(Continued)

(51) Int. Cl.
*B29B 17/02* (2006.01)
*C08L 23/06* (2006.01)
(Continued)

(52) U.S. Cl.
CPC ............... *B29B 17/02* (2013.01); *B09C 1/00* (2013.01); *B09C 1/08* (2013.01); *B29B 7/007* (2013.01);
(Continued)

(58) Field of Classification Search
CPC .... B09B 3/40; B09C 1/00; B09C 1/08; B09C 2101/00; B29B 17/02; B29B 7/007;
(Continued)

(56) References Cited

U.S. PATENT DOCUMENTS 8,449,650 B2 5/2013 Currier et al.
10,549,455 B2 2/2020 Kann
(Continued)

FOREIGN PATENT DOCUMENTS

CN 101258194 A 9/2008
CN 102634094 A 8/2012
(Continued)

OTHER PUBLICATIONS

Chinese Office Action for Application No. 201980033766.0, dated Nov. 25, 2021 (11 pages).
(Continued)

*Primary Examiner* — Frances Tischler
(74) *Attorney, Agent, or Firm* — Nutter McClennen & Fish LLP (57) ABSTRACT

The disclosed embodiments describe a novel approach to the utilization of the fine mineral matter derived from coal and/or coal refuse (a by-product of coal refining) to convert a non-biodegradable plastic into a biodegradable plastic. The fine mineral matter could also be based on volcanic basalt, glacial rock dust deposits, iron potassium silicate and other sea shore mined deposits. The conversion of the non-biodegradable plastic into biodegradable plastic in soil further increases nutrients availability in soil with the transition metals released as a result of biodegradation of the biodegradable plastic.

11 Claims, 3 Drawing Sheets

Related U.S. Application Data (60) Provisional application No. 62/647,818, filed on Mar. 25, 2018.

(51) Int. Cl.
*B29B 7/90* (2006.01)
*C08J 3/20* (2006.01)
*B09C 1/00* (2006.01)
*C05D 1/04* (2006.01)
*C05D 9/02* (2006.01)
*C05D 9/00* (2006.01)
*C05F 11/02* (2006.01)
*C05B 17/00* (2006.01)
*B29B 7/00* (2006.01)
*B09C 1/08* (2006.01)
*C08K 11/00* (2006.01)
*C08L 23/12* (2006.01)
*C10L 5/02* (2006.01)
*B29B 7/46* (2006.01)
*B29B 7/40* (2006.01)

(52) U.S. Cl.
CPC ............ *B29B 7/90* (2013.01); *C05B 17/00* (2013.01); *C05D 1/04* (2013.01); *C05D 9/00* (2013.01); *C05D 9/02* (2013.01); *C05F 11/02* (2013.01); *C08J 3/201* (2013.01); *C08J 3/203* (2013.01); *C08K 11/005* (2013.01); *C08L 23/06* (2013.01); *C08L 23/12* (2013.01); *B09C 2101/00* (2013.01); *B29B 7/40* (2013.01); *B29B 7/46* (2013.01); *C08J 2323/00* (2013.01); *C10L 5/02* (2013.01)

(58) Field of Classification Search
CPC .... B29B 7/40; B29B 7/46; B29B 7/90; C05B 17/00; C05D 1/04; C05D 9/00; C05D 9/02; C05F 11/02; C08J 2323/00; C08J 3/201; C08J 3/203; C08K 11/005; C08L 23/06; C08L 23/12; C10L 5/02
See application file for complete search history.

(56) References Cited

U.S. PATENT DOCUMENTS

| | | |
|---|---|---|
| 10,906,209 B2 | 2/2021 | Kann |
| 2008/0081844 A1 | 4/2008 | Shires et al. |
| 2009/0014689 A1 | 1/2009 | Klepper et al. |
| 2010/0003431 A1 | 1/2010 | Raybuck |
| 2010/0105822 A1 | 4/2010 | Girioli et al. |
| 2010/0168488 A1 | 7/2010 | Mehlberg et al. |
| 2011/0275878 A1 | 11/2011 | Meckenstock et al. |
| 2013/0090393 A1 | 4/2013 | Bracht et al. |
| 2014/0250858 A1 | 9/2014 | Mazumdar |
| 2014/0339726 A1 | 11/2014 | Guven |
| 2014/0364663 A1 | 12/2014 | Ramesh |
| 2015/0013609 A1 | 1/2015 | Weder |
| 2015/0037865 A1 | 2/2015 | Weder |
| 2016/0024398 A1 | 1/2016 | Ellingsen |
| 2016/0040074 A1 | 2/2016 | Methling |
| 2016/0160107 A1 | 6/2016 | Maxey et al. |
| 2016/0311728 A1 | 10/2016 | Swensen et al. |
| 2018/0155643 A1 | 6/2018 | Al-Ghamdi et al. |
| 2018/0273389 A1 | 9/2018 | Martin et al. |
| 2019/0291302 A1 | 9/2019 | Kann |
| 2020/0009762 A1 | 1/2020 | Kann |
| 2021/0122630 A1 | 4/2021 | Kann |

FOREIGN PATENT DOCUMENTS

| | | |
|---|---|---|
| CN | 104356463 A | 2/2015 |
| GB | 2220944 A | 1/1990 |
| JP | 2001316495 A | 11/2001 |
| WO | 2016/172240 A1 | 10/2016 |
| WO | 2019/190711 A1 | 10/2019 |

OTHER PUBLICATIONS

International Search Report and Written Opinion for International Application No. PCT/US2021/050480, dated Dec. 27, 2021 (14 pages).
Nkrumah, P., et al., "Element Case Studies: Nickel (Tropical Regions)" Agromining: Farming for Metals (Dec. 8, 2020): pp. 365-383.
Search Report for Chinese Patent Application No. 201980033766.0, dated Nov. 17, 2021 (3 pages).
Thampatti, K., et al., "Aquatic Macrophytes for Phytomining of Iron from Rice Based Acid Sulphate Wetland Ecosystems of Kuttanad," Journal of Indian Society of Coastal Agricultural Research, vol. 34 Issue 2 (2016): pp. 70-75.
Van Der Ent, A., et al., "Ultramafic nickel laterites in Indonesia (Sulawesi, Halmahera): Mining, nickel hyperaccumulators and opportunities for phytomining," Journal of Geochemical Exploration, vol. 128 (Jan. 26, 2013): pp. 72-79.
Barthelmy, D. Mineralogy Database. Last edited Sep. 5, 2012. Retrieved from the Internet under http://www.webmineral.com/ on Nov. 10, 2020 (2 pages).
Brems, et al., "Gasification of plastic waste as waste-to-energy or waste-to-syngas recovery route." Natural Science vol. 5, 2013, pp. 695-704.
Eletskii et al., "Catalytic Steam Cracking of Heavy Oil Feedstocks: A Review," Catalysis in Industry, vol. 10, No. 3, 2018, pp. 185-201.
Geyer et al., "Production, use and fate of all plastics ever made," Science Advances 3 (7), e1700782, Jul. 19, 2017 (5 pages).
Guin, et al., "Further Studies of the Catalytic Activity of Coal Minerals in Coal Liquefaction. 1. Verification of Catalytic Activity of Mineral Matter by Model Compound Studies" Ind. Engl. Chem. Process Des. Dev., vol. 18, No. 3, 1979, pp. 371-376.
International Search Report and Written Opinion for International Application No. PCT/US2020/058036 dated Jan. 28, 2021 (15 pages).
International Search Report and Written Opinion for International Application No. PCT/US2021/059682 dated Mar. 15, 2022, (19 pages).
Ragaert, et al., "Mechanical and chemical recycling of solid plastic waste," Waste Management, vol. 69, 2017, pp. 24-58.
Albertsson et al., "Degradation product pattern and morphology changes as means to differentiate abiotically and biotically aged degradable polyethylene", Polymer, vol. 36, No. 16, 1995, pp. 3075-3083.
Arnaud et al., "Photooxidation and biodegradation of commercial photodegradable polyethylenes", Polymer Degradation and Stability 46 (1994), pp. 211-224.
Billingham et al., "Environmentally Degradable Plastics Based on OXO-Biodegradation of Conventional Polyolefins", Springer US 2003, Univ. of Sussex, Brighton, BN1 9QJ, UK, and EPI Ltd., Unit 7, Dunstan Place, Dunstan Rd., Chesterfield, Derbyshire, S41 8NL, UK (10 pages).
Chandra et al., Department of Polymer Technology and Applied Chemistry, Delhi College of Engineering, Delhi-110006, India, "Biodegradable Polymers", Prog. Polym. Sci., vol. 23, 1998, pp. 1273-1335.
Chiellini et al., "Biodegradation of thermally-oxidized, fragmented low-density polyethylenes", Polymer Degradation and Stability 81(2), 2003, pp. 341-351.
Gao, J., "Coal, Oil Shale, Natural Bitumen, Heavy Oil and Peat—vol. I—Coal, Oil Shale, Natural Bitumen, Heavy Oil, and Peat", College of Resource and Environment Engineering, East China University of Science and Technology, Shanghai, China, © Encyclopedia of Life Support Systems (EOLSS) (1996).
Garthe, J., "Managing used agricultural plastics, in: Production of vegetables, strawberries, and cut flowers using plasticulture", 2004, Natural Resource, Agriculture and Engineering Service (NRAES), Ithaca, NY. (W. Lamont, ed.).

(56) References Cited

OTHER PUBLICATIONS

Gonzalez-Guerrero et al.,"Transition Metal Transport in Plants and Associated Endosymbionts:Arbuscular Mycorrhizal Fungi and Rhizobia", Frontiers in Plant Science, Jul. 2016, vol. 7, Article 1088 (22 pages).

Halley et al., "Developing Biodegradable Mulch Films from Starch-Based Polymers,"Starch/Starke 53, 2001, pp. 362-367.

International Search Report and Written Opinion for International Application No. PCT/US2019/021066, dated May 29, 2019 (22 pages).

Jakubowicz, I., "Evaluation of degradability of biodegradable polyethylene (PE), Polymer Degradation and Stability" 80 (2003) pp. 39-43.

Kasirajan et al., "Polyethylene and biodegradable mulches for agricultural applications: a review", Agron. Sustain. Dev. (2012) 32, pp. 501-529.

La Revue De L'Institut Veolia Facts Reports, 2019, pp. 62-74.

Miles et al., "Searching for Alternatives to Plastic Mulch", WSU Vancouver Research and Extension Unit, 1919 NE 78th Street, Vancouver, Washington; 2005; tel # (360) 576-6030,2005, milesc@wsu.edu, http://agsyst.wsu.edu (7 pages).

Scott, G., "'Green' Polymers", Polymer Degradation and Stability 68 (2000) pp. 1-7.

Scott, G., "Trends", Polym. Sci., 1997 (5), 361.

Sherman, J. "Synthetic zeolites and other microporous oxide molecular sieves," Proc. Natl. Acad. Sci. USA vol. 96, 1999, pp. 3471-3478.

U.S. Department of Agriculture. 2009. Summary Report: 2007 National Resources Inventory, Natural Resources Conservation Service, Washington, DC, and Center for Survey Statistics and Methodology, Iowa State University, Ames, Iowa. 123 pages.

Warnick et al., "Weed suppression with hydramulch, a biodegradable liquid paper mulch in development", Renewable Agriculture and Food Systems: 21(4); 2006, pp. 216-233.

Japanese Office Action for Application No. 2020-552798, dated Feb. 7, 2023, 12 pages.

UTILIZATION OF FINE MINERAL MATTER IN THE CONVERSION OF NON-BIODEGRADABLE PLASTIC AND IN REMEDIATION OF SOILS POLLUTED WITH NON-BIODEGRADABLE PLASTIC

CROSS-REFERENCE TO RELATED APPLICATIONS

This application is a continuation-in-part of U.S. application Ser. No. 16/571,275, filed on Sep. 16, 2019, which is a continuation of U.S. application Ser. No. 16/293,814, filed on Mar. 6, 2019, which issued as U.S. Pat. No. 10,549,455 on Feb. 4, 2020, which claims the benefit of U.S. Provisional Application No. 62/647,818, filed on Mar. 25, 2018, the contents of which are hereby incorporated herein by reference, in their entireties, including their drawings and appendices.

FIELD

The systems and methods of the present disclosure generally relate to the conversion of a non-biodegradable plastic into a biodegradable plastic. More specifically, in one embodiment, a method for remediation and treatment of soil using the biodegradable plastic is described.

BACKGROUND

Polyolefin Based Plastic Products In Soil

Over the past 60 years, agricultural output and productivity has significantly increased and plastic materials, mainly polyolefins (e.g. low density polyethylene (LDPE), high density polyethylene (HDPE), linear low density polyethylene (LLDPE), polypropylene (PP), and their copolymers and mixtures) made substantial contribution to this development. The main products based on polyolefins are films, drip-irrigation tubing and tapes. For the mulch film alone, it is estimated that about 1 million tons is used worldwide on over 30 million acres of land (P. Halley at al. "Starch" published in 2001 (53), page 362-367). For the USA these numbers in 2004 corresponded to about of 130,000 tons of mulch film usage annually, covering over 185,000 acres of agricultural land (J. P. Warnick at al. "Renewable Agriculture and Food Systems" published in 2006 (21), 216-233). These numbers have continued to grow significantly due to the benefits of mulch films such as increased soil temperature, reduced weed growth, moisture conservation, reduction of certain insect pests, higher crop yields, and more efficient use of soil nutrients.

One major drawback of polyolefins is their resistance to chemical, physical and biological degradation, along with the problem of removal and disposal of agricultural films and other agricultural products after their useful lifetime. If not removed, they tend to accumulate as waste, interfere with root development of the subsequent crop and create serious environmental problems. The cost of removing films from the soil and cleaning them is prohibitively high. This is the main reason why the farmers usually incorporate them into the soil by rototilling, or sometimes burn them in the fields. The problems with disposal of agricultural plastic waste and soil contamination with plastic waste become more and more severe because of increasing usage of plastics.

It is also known that since 2004 well over 1.5 million tons of plastic (primarily polyolefins) mulch film was used in USA. With these practices, it is expected that significant amounts of these plastics are accumulated in soil as waste. It is also known that soils polluted with plastic lose their agricultural value and need to be remediated regularly.

A possible solution to the agricultural plastic waste management would be deployment of biodegradable materials. Biodegradability could be achieved by utilization of soil biodegradable polymers, such as hydrolysable polyesters, e.g., poly(hydroxyalkanoates) (PHA), poly(butylene succinates) and their copolymers. However, despite many years of research and development, these polymers still did not make significant impact in the marketplace due to their inconsistent soil biodegradability and in a majority of cases the necessity of removal and composting, high cost, life cycle assessment (LCA) and inferior mechanical properties.

A far more promising solution lies in converting polyolefins, the polymers of choice for agricultural film markets, into biodegradable materials that further enriches the agricultural soil with nutrients. This is a quite an ambitious task as polyolefins are known to be bioinert due to their hydrophobicity and high molecular weights.

Transition Metals as Soil Nutrients

Transition metal salts and their mixtures are known to be important plant nutrients: iron, copper, zinc, molybdenum, among others, are needed to support photosynthesis, tolerance to biotic and abiotic stress or nitrogen fixation. However, plants often grow in soils with limited bioavailability (especially of metals in reduced form) and therefore rely on microorganisms for metal uptake. The U.S. Publication. No. 20160311728A1 teaches that coal-derived mineral matter mixed with soil is an effective soil amendment. It increases the silt and clay fractions of the soils and improves soil texture. However, it fails to provide a solution for the soils polluted with non-biodegradable waste.

SUMMARY

In accordance with some embodiments, compositions and methods convert a non-biodegradable plastic into a biodegradable plastic. To that end the compositions and methods may obtain an amount of carbon-free fine mineral matter derived from coal and/or mined from natural resources including volcanic basalt, glacial rock dust deposits, iron potassium silicate and/or sea shore deposits with particle sizes ranging from less than about 50 µm to about 2 µm; and melt blend, dry blend, or compound the fine mineral matter with the non-biodegradable plastic to convert the non-biodegradable plastic into the biodegradable plastic product.

In some embodiments, the non-biodegradable plastic can be a hydrocarbon based polymer selected from the list consisting of polybutenes, polymethylpentenes, polystyrene, styrene/acrylonitrile copolymers, acrylonitrile/butadiene/styrene terpolymers, acrylate/styrene/acrylonitrile terpolymers, sterene/butadiene/styrene and styrene/isoprene/styrene copolymers, acrylic, vinyl based polymers, polycarbonates, and their mixtures and copolymers, polyesters, polyethers, polyether esters, polyurethanes, polyacetals, polyisoprene, polybutadiene, polyvinyl alcohol, polyvinyl acetate, copolymers of vinyl alcohol and vinyl acetate, copolymers of ethylene and vinyl acetate, polyvinyl chloride, methacrylate/butadiene/styrene copolymers, thermoplastic polyurethane elastomers, or polyester elastomers. The biodegradable plastic can be converted into at least one of a film, a sheet, a fiber, a filament, or a molded form, or combinations thereof. The conversion can occur in soil. In alternate embodiments, the conversion can occur in a fresh water or marine environment.

In accordance with other embodiments, the fine mineral matter includes at least one transition metal selected from the group consisting of Fe, Cu, Mn, Mo, Zn, Co or combinations thereof at the following concentrations: Fe 14,000 to 55,000 ppm; Cu 10 to 90 ppm; Mn 100 to 1300 ppm; Mo 1 to 2 ppm; Zn 20 to 500 ppm; and Co 10 to 15 ppm, where ppm are measured with ICP-AES method utilizing nitric acid, hydrochloric acid and hydrogen peroxide in a heated digester. In some embodiments, the fine mineral matter includes of a promoter selected from the alkaline/alkaline earth group consisting of Ca, K, Mg or combinations thereof at the following concentrations: Ca 1,000 to 300,000 ppm; K 600 to 4,000 ppm; Mg 20 to 12,000 ppm; and/or other acidic or amine promoters. In some embodiments, the fine mineral matter can be sourced from different minerals including phyllosilicates, clays, sulfide minerals, phosphate minerals, aluminum (bauxite) tailings and their mixtures to obtain required composition and metals ratio. The fine mineral matter particles can be embedded on or mixed with organic or inorganic salts of transition metals and alkali/alkaline earth metals to enhance biodegradation performance. In some embodiments, the fine mineral matter is mixed with transition metal-based pigments to simultaneously provide the color and catalyze the biodegradation. The fine mineral matter can be sourced from phytomined or synthetic alternatives of geologic minerals.

In accordance with other embodiments, a modified soil composition can include a non-biodegradable plastic and an amount of fine mineral matter. The fine mineral matter has a particle size from 2 to 200 microns is derived from coal and/or mined from natural resources including volcanic basalt, glacial rock dust deposits, iron potassium silicate and/or sea shore deposits, mixtures of minerals such as phyllosilicates, clays, tailings, synthetic or phytomined minerals, and where the fine mineral matter causes the non-biodegradable plastic to become biodegradable.

In accordance with some embodiments, the fine mineral matter comprises at least one transition metal selected from the group consisting of Fe, Cu, Mn, Mo, Zn, Co or combinations thereof at the following concentrations: Fe 14,000 to 55,000 ppm; Cu 10 to 90 ppm; Mn 100 to 1300 ppm; Mo 1 to 2 ppm; Zn 20 to 500 ppm; and Co 10 to 15 ppm, where ppm are measured with ICP-AES method utilizing nitric acid, hydrochloric acid and hydrogen peroxide in a heated digester. In some embodiments, the fine mineral matter can include a promoter selected from the group consisting of Ca, K, Mg or combinations thereof at the following concentrations: Ca 1,000 to 300,000 ppm; K 600 to 4,000 ppm; Mg 20 to 12,000 ppm; and/or other acidic or amine promoters.

In some embodiments, the concentration of the fine mineral matter in soil is determined by at least one of the factors comprising: the composition of the mineral, specifics of soil, specifics of the non-biodegradable plastic, climatic conditions and desired useful lifetime of the formulated biodegradable plastic.

In accordance with other embodiments, a method of soil remediation includes obtaining an amount of carbon free fine mineral matter derived from coal and/or mined from natural resources including volcanic basalt, glacial rock dust deposits, iron potassium silicate and/or sea shore deposits, mining tails, phytomining, synthetic sources, and blending it with the soils polluted with plastic waste.

In some such embodiments, the plastic waste can be based on materials such as polybutenes, polymethylpentenes, polystyrene, styrene/acrylonitrile copolymers, acrylonitrile/butadiene/styrene terpolymers, acrylate/styrene/acrylonitrile terpolymers, sterene/butadiene/styrene and styrene/isoprene/styrene copolymers, acrylic, vinyl based polymers, polycarbonates, polyesters, polyethers, polyether esters, polyurethanes, polyacetals, polyisoprene, polybutadiene, polyvinyl alcohol, polyvinyl acetate, copolymers of vinyl alcohol and vinyl acetate, copolymers of ethylene and vinyl acetate, polyvinyl chloride, methacrylate/butadiene/styrene copolymers, thermoplastic polyurethane elastomers, polyester elastomers. In some embodiments, the plastic waste is a polyolefin-based material or a polyethylene mulch film.

In accordance with other embodiments, the method can further include mixing mineral matter with particle size ranging from about 2 microns to about 200 microns with water to form a water slurry that is added to the soil for the purpose of remediation of soils polluted with non-biodegradable plastics. In some embodiments, the water slurry can include one or more oxidizing agents that includes hydrogen peroxide, the water slurry having a composition of: Fine mineral matter: approximately 10 to approximately 95%; Water: approximately 5 to approximately 95%; and Hydrogen peroxide approximately 0 to approximately 5%.

From the foregoing disclosure and the following more detailed description of various embodiments, it will be apparent to those skilled in the art that the present disclosure provides a way to utilize fine mineral matter to convert non-biodegradable plastic into biodegradable plastic. Particularly significant in this regard is the potential the embodiments afford for providing a relatively simple, low cost and efficient conversion of non-biodegradable plastic into biodegradable plastic. Additional features and advantages of various embodiments will be better understood in view of the detailed description provided below.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

A non-biodegradable plastic can be made biodegradable via an oxidative degradation process catalyzed in the presence of light, heat or pro-degrading additives. During this oxidative degradation the molecular chains of non-biodegradable plastic are reduced by oxidation, creating carboxylic acids, alcohols and ketones. The originally hydrophobic macromolecules become more hydrophilic and favour extracellular enzyme activity leading to subsequent breakdown of polymer chains (see e.g., N. C. Billingham, E. Chiellini, A. Corti, R. Baciu and D. W. Wiles, in ENVIRONMENTALLY DEGRADABLE PLASTICS BASED ON OXO-BIODEGRADATION OF CONVENTIONAL POLYOLEFINS, Springer US 2003). The pro-degrading additives used for oxidative degradation contain different mixtures of transition metal salts (e.g., iron, copper, nickel, cobalt, zinc, manganese, titanium, zirconium, molybdenum), with or without alkaline earth salts (e.g., calcium, magnesium) and with or without the presence of other ingredients such as substituted benzophenones, unsaturated organic compounds, peroxides, biodegradable plasticizers, waxes, etc.

The present embodiment utilizes the fine mineral matter to convert the non-biodegradable plastic into biodegradable plastic. The fine mineral matter is derived from coal and/or mined from natural resources, such as volcanic basalt, glacial rock dust deposits, iron potassium silicate and other sea shore deposits. The non-biodegradable plastic is completely degraded and converted into biodegradable plastic due to oxidative degradation of non-biodegradable plastic caused by the transition metals present in the fine mineral matter. and other additives participating in electron exchange and regeneration of reduced ions of transition metals. The biodegradable plastic undergoes biodegradation to remediate and treat the soil, thereby improving the texture and increasing the nutrients availability.

Fine Mineral Matter Derived From Coal

Coal comprises low-quality coal mixed with fine mineral matter containing a plurality of elements, among them transition metal compounds such as Fe, Cu, Mn, Mo, Zn, Co and alkali/alkali earth metals such as K, Ca, Mg. The residual fine mineral matter is discarded as a "waste" after coal cleaning processes and ends up either filling ravines, streams, mountain hollows or is randomly disposed in piles near the mine sites.

Another source of deriving fine mineral matter is its separation during recovery of coal refuse. It is known that about 1 billion tons of coal refuse is discarded each year.

The fine mineral matter inherent in coal refuse or fine-size coal is separated with froth flotation with particle sizes ranging from less than about 50 µm to about 2 µm. The separation process separates fine-size coal particles by selective attachment of air bubbles to coal particles, causing them to be buoyed to the surface of a coal-water suspension system where they are collected in a froth. Since fine mineral matter particles remain unattached, they are not recovered in the froth and are present in the tailing or the underflow. The fine mineral matter is recovered when the flotation cell is drained. This process deals with fine particles in a turbulent, aqueous system where specific gravity is not as significant as the surface properties of the particles. This is one of the principal processes used for cleaning fine-sized coal, however other suitable techniques can also be used.

The concentration of metals and metal salts depends on the analytical method being used and is typically measured by X-ray techniques: fluorescence (XRF) and diffraction (XRD) and Inductively Coupled Plasma Acid Elemental Analysis (ICP-AES). The X-ray methods are non-destructive and determine the elemental composition of materials in bulk. The ICP methods require digestion of minerals in either strong acids to estimate the concentration of elements that could potentially become "environmentally available" (ICP-AES) or in milder dissolution solvents to provide more realistic soil availability. The elements bound in silicate structures, e.g., are not normally dissolved by these procedures, as they are not usually mobile in the environment. This technique is generally used to show compliance in EPA 503 heavy metal regulations.

The concentration of the transition metals and the alkali/alkali earth metals in the coal refuse varies for different coal sites and are presented in the Table 1 below. The concentrations measured are based on the ICP-AES method utilizing nitric acid, hydrochloric acid and hydrogen peroxide in a heated digester. The compositions of different refuses were shown to differ, but all had Iron as the major element, and the rest of the elements were also present in each refuse. Table 1 confirms that the concentration of toxic and regulated heavy metals is below regulatory limits, which are also provided.

TABLE 1

Fine mineral matter ICP-AES and WDXRF tests.

| | | | | EPA 40 CRF Part 503 in soil | | | |
|---|---|---|---|---|---|---|---|
| | Coal derived fine mineral matter | | EN 17033:2018 | Bio Solids | | Sludge | |
| | | | Upper | Upper | | Annual | |
| Elements | WDXRF ppm In bulk | ICP-AES, ppm | limit ICP, ppm | limit ICP, ppm Strong digestion | Max concen. Ppm | loading rates, lb/A/yr | Cumulative loading rates, lb/A |
| Aluminum | | 15,200-15,700 | | | | | |
| Arsenic | <20 | 5-11 | | <41 | <75 | 1.8 | 36.6 |
| Barium | | 300-500 | | | | | |
| Beryllium | | 0.9-1.1 | | | | | |
| Boron | | 5-17 | | | | | |

TABLE 1-continued

Fine mineral matter ICP-AES and WDXRF tests.

| | Coal derived fine mineral matter | | EN 17033:2018 | Bio Solids | EPA 40 CRF Part 503 in soil | | |
|---|---|---|---|---|---|---|---|
| | | | Upper | Upper | | Sludge | |
| | | | | | | Annual | |
| Elements | WDXRF ppm In bulk | ICP-AES, ppm | limit ICP, ppm | limit ICP, ppm Strong digestion | Max concen. Ppm | loading rates, Ib/A/yr | Cumulative loading rates, Ib/A |
| Cadmium | | 0-0.32 | <0.5 | <39 | <85 | 1.7 | 34.8 |
| Calcium | | 8,590-17,000 | | | | | |
| Chloride | | 23-304 | | | | | |
| Chromium | | 14-28 | <50 | <1,200 | 3,000 | 134 | 2,679 |
| Cobalt | | 8-12 | | <20 | | | |
| Copper | | 23-43 | <50 | <1,500 | 4,300 | 67 | 1,340 |
| Fluoride | | 3-5.6 | | | | | |
| Iron | | 18,900-30,100 | | | | | |
| Lead | 20 | 14-20 | <50 | <300 | 420 | 14 | 375 |
| Magnesium | | 4,780-5,190 | | | | | |
| Manganese | | 193-253 | | | 5,500 | | |
| Mercury | | 0.06-0.068 | <0.5 | <17 | 840 | 13.4 | 268 |
| Molybdenum | | 1-1.93 | | <18 | 57 | 0.8 | 15 |
| Nickel | | <11 | <25 | <420 | 75 | 0.8 | 16 |
| Niobium | 28 | | | | | | |
| Phosphorus | | 139-203 | | | | | |
| Potassium | | 2000-2,980 | | | | | |
| Rubidium | 150 | | | | | | |
| Selenium | | ND* | | <36 | 100 | 4 | 89 |
| Silicon | | 453-716 | | | | | |
| Silver | | ND* | | | | | |
| Sodium | | 386-1000 | | | | | |
| Strontium | 279-374 | | | | | | |
| Sulfur | | 1,920-3,300 | | | | | |
| Thorium | 20 | | | | | | |
| Tin | <50 | ND* | | | | | |
| Tungsten | <10 | | | | | | |
| Uranium | <20 | | | | | | |
| Vanadium | 130 | 13-16 | | | | | |
| Yttrium | 40-45 | | | <100 | | | |
| Zinc | | 71-83 | <150 | <2,800 | 7,500 | 125 | 2,500 |

*ND = Not Detectable

In some embodiments, the fine mineral matter derived from coal, as discussed above, can include one or more salts to enhance performance of the resultant embodiments. For example, such salts can be organic or inorganic salts of transition metals and/or alkali/alkaline earth metals. A person skilled in the art will recognize that these organic or inorganic salts of transition metals and alkali/alkaline earth metals can be embedded, mixed, or otherwise distributed throughout the fine mineral matter. The degree of distribution of the salts throughout the fine mineral matter can impact the efficiency of the resultant methods, with more uniform distributions allowing for more efficient conversion of the nonbiodegradable plastics to biodegradable plastics.

In some embodiments, the fine mineral matter can be further mixed with transition metal-based pigments to provide the color and catalyze the biodegradation. Many of the concentrated transition element mineral ores have intense colors and are frequently used as pigments. The coloration of these mineral ores can be due to the idiochromatic (self-colored) nature or allochromatic nature—when transition metals are present as impurities and produce color due to their dopants or activator effect. As an example, cuprous copper, $Cu^+$ with cobalt impurities is known to have a blue coloration. The same compound is capable of reacting with hydroperoxides and drive redox reactions required for the abiotic degradation of polyolefins or other polymers that are sensitive to oxidation. If classified by their catalytic efficiency, transition metal-based pigments could be ranked by their color, e.g., blue colored film could be used for fast abiotic cycle. The list of idiochromatic transition element compounds include rhodonite $MnSiO_3$ (pink color), spessartite garnet $Mn_3Al_2Si_3O_{12}$ (orange), manganese (II) oxide MnO (green), manganese alum $KMn(SO_4)_2 \times H_2O$ (violet), melantite $FeSO_4 \times 7H_2O$ (green), hematite $Fe_2O_3$ (red to brown), goethite FeO(OH) (yellow), iron alum $KFe(SO_4)_2$ (violet), and/or azurite $Cu_3(CO_3)_2(OH)_2$ (blue).

Some non-limiting examples of pigments capable of accelerating biodegradation in polymers that are sensitive to oxidation include Milori blue, Copper phthalocyanine green, Cobalt blue, Cobalt violet, titanium dioxide, oxidic black pigments: iron oxide black and spinel black; oxidic colored pigments: red Iron oxide Fe¬2O3, C.I. Pigment Red 101, C.I. Pigment Yellow 157, C.I. Pigment Yellow 53, C.I. Pigment Yellow118, C.I. Pigment Yellow119, C.I. Pigment Green 17, C.I. Pigment Green 19, C.I. Pigment Blue 28, C.I. Pigment Brown 6, C.I. Pigment Brown 29; pigments with hydroxyl content C.I. Pigment Yellow 42; sulfidic pigments C.I. Pigment Yellow 37, C.I. Pigment Orange 20; C.I. Pigment Blue 29, among others. A person skilled in the art will recognize that the pigments can be on a scale of degradation based on color.

Fine Mineral Matter from Other Naturally Occurring Sources

Other fine mineral matter could be based on volcanic ash deposits mined in Utah and sold under the trade name Azomite. It is marketed as mineralized soil fertilizer, but also includes transition metals in its composition and is approved for organic farming.

Another example of fine mineral matter could be based on volcanic basalt, e.g., a product mined by Cascade Minerals. It is also used for soil mineralization and is approved for organic farming.

Another example of fine mineral matter could be based on glacial rock dust deposits, e.g., glacial rock dust deposits sold by Gaia Green Product Ltd.

Another example is iron potassium silicate, containing 20% iron oxide FeO2, e.g., products supplied by Gaia Green Product Ltd based on ancient algae sea shore mined deposits.

In some embodiments, the fine mineral matter can also be also sourced from certain types of phyllosilicates (e.g. glauconite, biotite) and from certain types of clays (e.g., illite, chlorite) and mixed to form the basis of the methods disclosed herein. For example, in some embodiments, phyllosilicates and clays can be mixed in specific quantities in order to create fine mineral matter of a desired composition. The resulting mixture can contain various types of transition metals, alkali/alkaline earth metals, and so forth in optimized ratios to promote efficient conversion of the non-biodegradable plastic into the biodegradable plastic and their ratios. In some embodiments, the desired composition can also be obtained by mixing different mining tails and controlling the particle size and particle size distribution of the mixed particles. Examples include but not limited to sulfide, phosphate minerals, aluminum (bauxite tailings), and other similar sources. A person skilled in the art will recognize that a size of the mineral particles can be controlled by the grinding, milling and other particle reducing techniques known to one skilled in the art.

In some embodiments, the fine mineral matter can be sourced by phytomining. For example, one or more plants can be grown to accumulate high concentrations of the transition metals discussed above, e.g., Fe, Cu, Mn, Mo, Zn, Co and alkali/alkali earth metals such as K, Ca, Mg. Once a sufficient concentration of the transition metals are accumulated in the plant, the plant can be burned and ions of the transition metal can be extracted therefrom to accumulate a desired composition of the metal.

Fine Mineral Matter from Other Sources

In some embodiments, the fine mineral matter could be based on other, non-naturally occurring sources. For example, the fine mineral matter can be synthesized or collected from a synthetic source. These synthetic alternatives can be used in addition to, or in lieu of, geologic minerals, such as the fine mineral matter from naturally occurring sources, so long as the synthetics have a given amount of one or more of (chemical elements), purity (no competing donor/acceptor electron transfer, no electron/hole centers), required bonding, ligand field strength, photo and thermo sensitivity and activation energy of transitions, required porosity and surface energy, required moisture of hydration.

Figure 1:
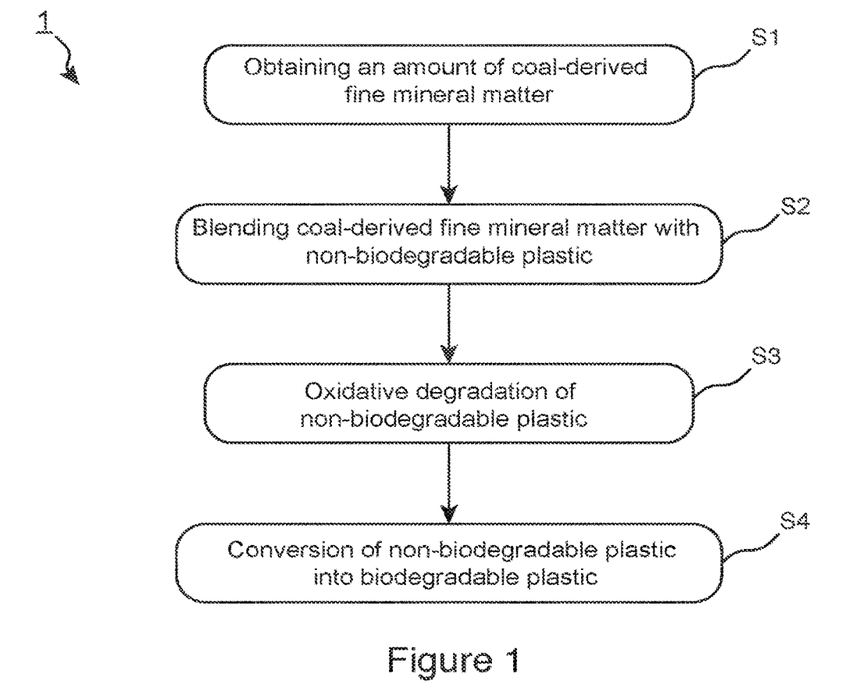
FIG. 1 represents a flow diagram illustrating the method of conversion of the non-biodegradable plastic into biodegradable plastic according to an embodiment of the presently disclosed embodiments.

Conversion of Non-Biodegradable Plastics into Biodegradable Plastics by Utilization of Fine Mineral Matter In the embodiment shown in FIG. 1, a flow diagram 1 of a method of conversion of a non-biodegradable plastic into the biodegradable plastic is described. The non-biodegradable plastic to be converted is a polyolefin-based plastic such as LDPE, HDPE, LLDPE, PP and their copolymers and mixtures. In an alternative embodiment, the non-biodegradable plastic is a hydrocarbon based polymer from the list which includes, but is not limited to polybutenes, polymethylpentenes, polystyrene, styrene/acrylonitrile copolymers, acrylonitrile/butadiene/styrene terpolymers, acrylate/styrene/acrylonitrile terpolymers, sterene/butadiene/styrene and styrene/isoprene/styrene copolymers, acrylic, vinyl based polymers, polycarbonates, and their mixtures and copolymers. In addition, polyesters, polyethers, polyether esters, polyurethanes, and polyacetals polyvinyl alcohol, polyvinyl acetate, copolymers of vinyl alcohol and vinyl acetate, copolymers of ethylene and vinyl acetate, polyvinyl chloride, methacrylate/butadiene/styrene copolymers, thermoplastic polyurethane elastomers, polyester elastomers are included in the list.

The method of conversion illustrated in flow diagram 1 and as shown in FIG. 1 begins with S1 where an amount of fine mineral matter is obtained. The fine mineral matter is separated from the coal refuse and/or fine-size coal with the froth flotation separation process described above. The fine mineral matter could also be mined from natural sources, such as volcanic basalt, glacial rock dust deposits, iron potassium silicate and other sea shore mined deposits. The particle size of the fine mineral matter ranges from less than about 50 μm to about 2 μm. The fine mineral matter comprises at least one and more preferably at least two transition metals selected from the group consisting of Fe, Cu, Mn, Mo, Zn, Co, or combinations thereof to cause the oxidative degradation of the non-biodegradable plastic. These transition metals in the fine mineral matter have concentrations measured with ICP-AES method utilizing nitric acid, hydrochloric acid and hydrogen peroxide in a heated digester and are defined in the range shown in Table 2.

TABLE 2

Concentration range of the transition metals in the fine mineral matter.

| Transition Metal | Concentrations Range in ppm |
|---|---|
| Fe | 14,000-55,000 |
| Cu | 10-90 |
| Mn | 100-1,300 |
| Mo | 1-2 |
| Zn | 20-500 |
| Co | 10-15 |

The fine mineral matter further comprises a promoter from the list of Ca, K, Mg or combinations thereof, to promote the oxidative degradation of the non-biodegradable plastic. The promoter in the fine mineral matter has concentrations defined in the range shown in Table 3. Other alkaline/alkaline earth containing minerals with similar fractions of soluble cations can also be used as promoters for oxidative degradation.

TABLE 3

Concentration range of the promoter in the fine mineral matter.

| Promoter (Alkali/Alkali Earth Metal) | Concentrations Range in ppm |
|---|---|
| Ca | 1,000-300,000 |
| K | 600-4,000 |
| Mg | 20-12,000 |

In step S2, the fine mineral matter is melt blended, dry blended, or compounded with the non-biodegradable plastic. The fine mineral matter is added to the non-biodegradable plastic directly or via masterbatches or concentrates, wherein the masterbatches or concentrates are well-dispersed mixtures of a polymer and high percentages of one or more components (e.g., fine mineral matter and additives) in known proportions for use in blending in appropriate amounts with the basic polymer in the preparation of a compound. Masterbatches or concentrates can be prepared by any known melt blending techniques, preferably extrusion. Single, twin, or quad screw extruders with different L:D (length to diameter) ratios can be used. The concentrations of the fine mineral matter in the masterbatches are believed to be in the range of about 3 to about 50 wt. %. The concentration of the fine mineral matter in the non-biodegradable plastic is determined by at least one of the factors comprising, composition of the transition metals, specifics of the non-biodegradable plastic resin, climatic conditions and desired useful lifetime of the formulated biodegradable plastic.

In step S3, the non-biodegradable plastic undergoes oxidative degradation abiotically. The transition metals in the fine mineral matter catalyze oxidative degradation and conversion of the non-biodegradable plastic into the biodegradable plastic. In case of polyolefins and other hydrocarbon-based polymers sensitive to radical chain processes, the rate-determining part of the degradation process is the oxidation segment, commonly called peroxidation. Hydrocarbon polymers vary in their ability to resist (or undergo) peroxidation. Thus, the oxidative stability increases from natural rubber (cis-poly(isoprene)) to poly(butylene) to polypropylene to polyethylene to polyvinyl chloride. Within polyethylenes, due to their chemical and morphological characteristics, LDPE and LLDPE are more susceptible to oxidative degradation than HDPE.

Abiotic peroxidation of the polyolefins produces vicinal hydroperoxides. This process is particularly favored in poly-a-olefins, such as polypropylene due to the susceptibility of the tertiary carbon atom to hydrogen abstraction. The vicinal hydroperoxides are unstable and can be converted to free radicals under heat and/or UV light. These radicals in turn initiate new oxidation chains. Since the monomolecular hemolytic decomposition of hydroperoxide groups into free radicals requires relatively high activation energies, this process becomes effective only at temperatures in the range of 120° C. However, in the presence of catalytic amounts of transition metal ions, hydroperoxides decompose at room temperature by a redox mechanism shown in the Reactions 1 below.

$$2ROOH \rightarrow ROO \cdot + RO \cdot + H_2O \qquad \text{Reactions (1)}$$

These free radicals enter a chain reaction with oxygen and C—H bonds in the non-biodegradable plastic to yield a range of oxidation products. The extent of oxidative degradation of non-biodegradable plastic (all above mentioned polymers) strongly depends on the number of other factors, including their composition, purity, and glass transition temperature.

The challenge in designing fully biodegradable systems based on polyolefins is in driving their oxidative degradation to the point when their structure is transformed from hydrophobic to hydrophilic and their molecular weight reduced to <20,000 or <15,000 g/mol. To support continuous oxidative degradation and transformation of non-biodegradable plastic it is essential to enable regeneration of reduced transition metals ions when they are used to accelerate the oxidative degradation process. Such regeneration can be driven by the redox reactions during the catalytic degradation and by providing the best conditions to promote recurring reactions. It is known that $Fe_{3+}$ is the thermodynamically favored oxidation state for iron under aerobic and alkaline conditions, whereas $Fe_{2+}$ is favored under anaerobic and acidic conditions. The present embodiments can use catalytic systems enabling the electron transfer and regeneration of reduced ions of transition metals, which would catalyze decomposition of the hydroperoxide groups into free radicals and consequently decomposing non-biodegradable plastic polymers according to Reactions 1 above. For that purpose the catalytic systems, in addition to containing multiple transition metal ions, also contain accelerators of redox reactions. To facilitate conversion of $Fe_{2+}$ into $Fe_{3+}$ carboxylic acids such as steric acids can be used according to Reactions 2 below.

where "P" is a polymer chain,

The acid accelerators could be other known carboxylic acids such as palmic acid, lauric acid, arachidic acid, nonadecylic acid, myristic acid, capric acid, valeric acid, caproic acid, butyric acid and amino acids.

Unsaturated (including polyunsaturated) carboxylic acids such as oleic, palmitoleic, vaccenic, linoleic, arachidonic, nervonic, stearidonic, erucic, rumenic, pinolenic, etc. would be strongly preferred Dicarboxylic acids, tricarboxylic acids, alpha hydroxyl acids, divinylether fatty acids could be other examples of accelerators To facilitate regeneration of $Fe_{2+}$, amine compounds can be used according to Reactions 3:

Reactions 3

The amine accelerators could be monomeric aliphatic amines, e.g. stearyl amine, or polymer-based amines, e.g. [(3-(11-aminoundecanoyl) amino) propane-1-] silsesquioxane (polyhedral oligomeric silsesquioxane, POSS), and chitosan. They could be more preferred due to their lower leakage potential from polyethylene (due to its structure and molecular weight).

Additionally, the fine mineral matter contains other additives selected from antioxidants, pigments, IR absorbers, lubricants, unsaturated organic compounds, substituted benzophenones, peroxides, biodegradable plasticizers, waxes, UV and thermal stabilizers, biodegradable polymers and oligomers, or combinations thereof. Additives in combination with transition metals promote their ability to decompose hydroperoxides and form free radicals.

In order to control both the lifetime of a biodegradable plastic during use as well as the rate of subsequent biodegradation in the environment, the onset of degradation must be controlled by appropriate antioxidants. Antioxidants are used to inhibit oxidative degradation of plastics to provide required initial properties of plastic materials. Because the present embodiments use transition metal ions to catalyze the decomposition of hydroperoxides, the utilization of primary antioxidants to control the onset of oxidative degradation would be the most preferred option. Primary antioxidants stabilize free radicals, especially peroxyl radicals, (POO.) by donating hydrogen (H), thus preventing formation of new alkyl radicals (P.) via abstraction of a hydrogen from a nearby polymer chain. The action of primary antioxidants reduces but does not prevent degradation. This in turn leads to accumulation of hydroperoxides, which after the consumption of primary antioxidants are going to be decomposed by transition metal ions at the environmental conditions. The secondary antioxidants, which are chemically reducing hydroperoxides would be less preferred (e.g. phosphites, thioesters).

Finally, in step S4, the non-biodegradable plastic is converted into the biodegradable plastic. Potential concentrations of the fine mineral matter in final products are from about 0.1 to about 3 wt. %.

In another embodiment, a biodegradable polyolefin composition is described. The biodegradable polyolefin composition comprises a non-biodegradable polyolefin-based product and an amount of fine mineral matter, wherein the non-biodegradable polyolefin-based product is melt-blended, dry blended or compounded with the fine mineral matter with particle size ranging from less than about 50 μm to about 2 μm. The concentration of the fine mineral matter in the non-biodegradable polyolefin-based product is determined by at least one of the factors comprising composition of the transition metals, specifics of the non-biodegradable plastic resin present in soil, climatic conditions and desired useful lifetime of the formulated biodegradable polyolefin. A transition metal from the group consisting of Fe, Cu, Mn, Mo, Zn, Co, or combinations thereof present in the fine mineral matter act as pro-oxidants and cause oxidative degradation of the non-biodegradable polyolefin-based product. The transition metals in the fine mineral matter have concentrations defined in the range shown in the Table 2 above. The oxidative degradation converts the non-biodegradable polyolefin-based product into a biodegradable polyolefin composition according to the Reactions 1, Reactions 2 and Reactions 3 described above. In some embodiments, the biodegradable plastic can be converted into at least one of a film, a sheet, a fiber, a filament, or a molded form, or combinations thereof.

Further, conversion of non-biodegradable plastic into biodegradable plastic can take place in the fresh water or marine environment. The floating in water plastics, such as but not limited to polyolefins (polyethylenes, polypropylene, their copolymers, polymethylpentene, polybutene, etc.), natural rubber, nylons, acrylonitrile butadiene styrene copolymers, polystyrene, would be subjected to UV light almost at all times and would go through the abiotic degradation by described above mechanisms. J.-F. Ghiglione, in his response to the Eunomia Report also describes the presence of the specific bacteria such as *Alcanivorax borkumensis* and *R. rhodochrous* which are ubiquitous in the oceans and able to biodegrade hydrocarbons. The population of such microorganisms is known to increase in response to increased availability of a food source, e.g. oil spills. The chemical break down of the polymeric molecules and their increasing hydrophilicity would also prevent ocean pollutants such as PCBs (polychlorinated biphenyls) adsorb onto the plastic surface, which is a known problem with non-biodegradable plastics.

Figure 2:
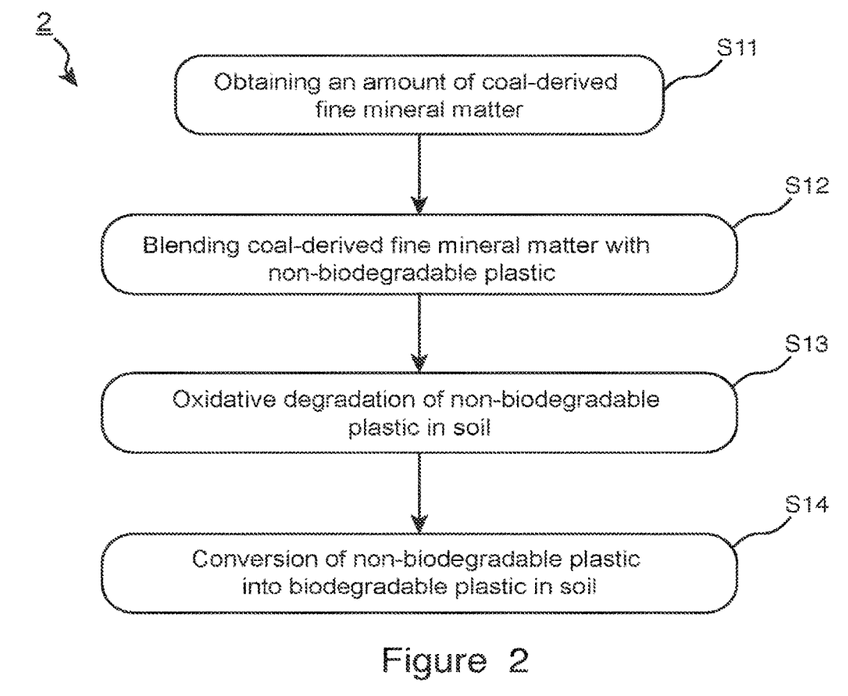
FIG. 2 represents a flow diagram illustrating the method of conversion of non-biodegradable plastic in soil into biodegradable plastic according to another embodiment of the presently disclosed embodiments.

In another embodiment shown in FIG. 2, a flow diagram 2 of a method of conversion of a non-biodegradable plastic in soil into a biodegradable plastic is described. The operating conditions are identical to those of the preferred embodiment.

The method of conversion illustrated in flow diagram 2 and as shown in FIG. 2 starts with step S11 where an amount of fine mineral matter having particle sizes ranging from nanoscale to 500 microns or larger, though in some embodiments, the range can be from 1 micron to 300 microns and larger, from 2 microns to 200 microns and larger, from 3 microns to 100 microns and larger, and so forth is obtained. The concentration of the transition metals in the fine mineral matter is defined in the range shown in the Table 2 above. The fine mineral matter comprises a transition metal from the group consisting of Fe, Cu, Mn, Mo, Zn, Co, or combinations thereof to cause the oxidative degradation of the non-biodegradable plastic.

The fine mineral matter further comprises a promoter from the group consisting of Ca, K, Mg, or combinations thereof with concentrations defined in the Table 3 above.

In step S12, the fine mineral matter is mixed with a non-biodegradable plastic. Further, about 10 to 30 wt. % of fine mineral matter would be needed to be blended with the non-biodegradable plastics present in soil. The concentration of the fine mineral matter in the soil is determined by at least one of the factors comprising composition of the transition metals, specifics of the non-biodegradable plastic resin, climatic conditions and desired useful lifetime of the formulated biodegradable plastic. The blending can be done with a rototiller to achieve a homogeneous dispersion. A few rototilling soil treatments are recommended to promote better dispersion of the fine mineral matter in soil.

In step S13, the non-biodegradable plastic in soil undergoes oxidative degradation. The transition metals in the fine mineral matter together with other promoters, such as carboxylic acids and primary amine based compounds and alkaline and alkaline earth metals act as a catalyst promoting redox reactions and leading to oxidative degradation of the non-biodegradable plastic to convert the non-biodegradable plastic into the biodegradable plastic according to Reactions 1, Reactions 2 and Reactions 3 described above. The promoters in the fine mineral matter further promote the oxidative degradation of the non-biodegradable plastic into the biodegradable plastic in soil.

Finally, in step S14, the non-biodegradable plastic is converted into the biodegradable plastic in soil.

To enhance retention of the fine mineral matter in the soil comprising non-biodegradable plastic product, the fine mineral matter can be mixed with water and be used in a form of a slurry. The slurry could be applied to the polluted areas of the soil or to accelerate the degradation of the agricultural mulch film once it is tilled in the soil.

To further promote the oxidation of the non-biodegradable plastic product in the soil, the slurry containing the fine mineral matter can also contain hydrogen peroxide or other oxidizing agents. An exemplary embodiment of the slurry can include fine mineral matter in a range from approximately 10 to approximately 95%; water in a range from approximately 5 to approximately 95%; and hydrogen peroxide in a range from approximately 0 to approximately 5%. Examples of other oxidizing agents are permanganate compounds such as potassium permanganate ($KMnO_4$), nitric acid ($HNO_3$) and nitrate compounds, sulfuric acid ($H_2SO_4$), peroxidisulfuric acid ($H_2S_2O_8$), peroxymonosulfuric acid ($H_2SO_5$), hypochlorite, chlorite, chlorate, perchlorate and other analogous halogen compounds, sodium perborate, potassium nitrate ($KNO_3$), sodium bismuthate ($NaBiO_3$).

Soil Treatment and Soil Remediation with Biodegradable Plastic

The practice of tilling or mulching plastic films into the soil can result in plastic residues accumulating in the soil as a consequence of using plastic mulching, which results in a serious environmental concern for agroecosystems.

The fine mineral matter containing transition metals provides soil nutrition, recovers the soil fertility and conditions the soil. The soil analysis data based on ICP using milder dissolution solvents (simulating soil conditions for metal salt dissolution) with reference to Table 4, confirms the presence of following plant nutrients:

TABLE 4

| | ICP digestion solvents | | |
| --- | --- | --- | --- |
| | strong acids ICP AES | buffered ICP | buffered ICP |
| Phosphorus ($P_2O_5$), ppm | 256 | 2.8 | 13.7 |
| Potassium, ppm | 3,298 | 80.5 | 91.4 |
| Magnesium, ppm | 4,734 | 225 | 268 |
| Calcium, ppm | 9,420 | 1,693 | 1,473 |
| Sodium, ppm | 882 | 254 | 135 |
| Sulfur $SO_4$, ppm | 3,214 | 247 | 134 |
| Zinc, ppm | 72 | 24 | 4.9 |
| Manganese, ppm | 191 | 5 | 12 |
| Iron, ppm | 17,488 | 25 | 339 |
| Copper, ppm | 37 | 35 | 26 |

Figure 3:
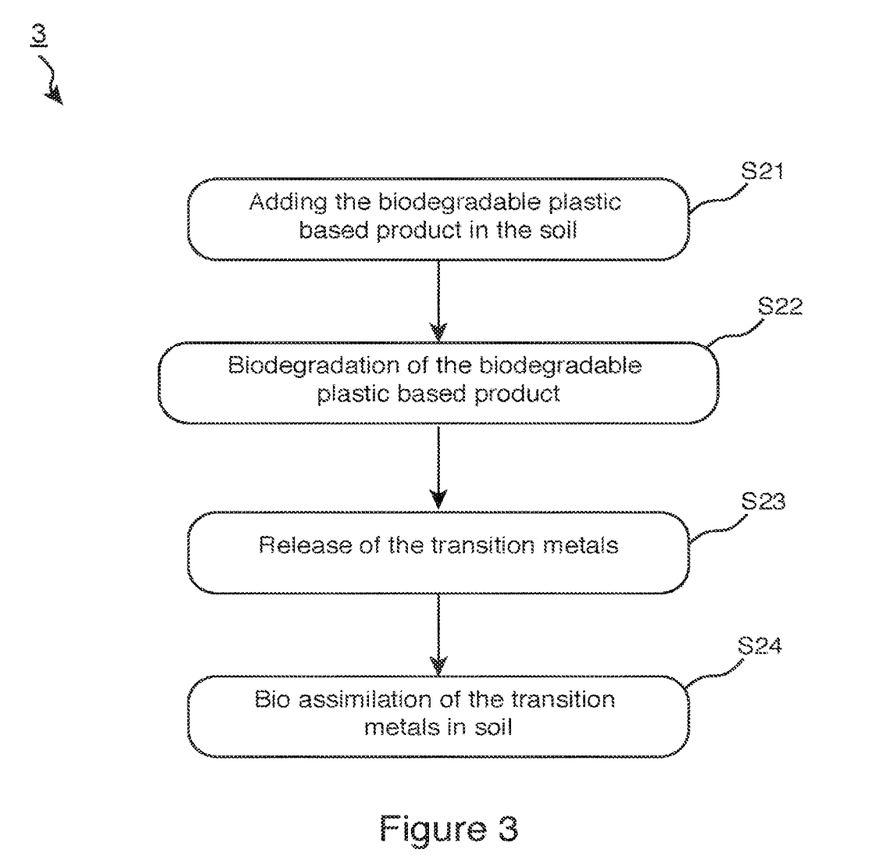
FIG. 3 represents a flow diagram illustrating the method of treatment of soil according to another embodiment of the presently disclosed embodiments.

In another embodiment shown in FIG. 3, a flow diagram 3 of a method for treatment of soil is described. A biodegradable plastic-based product is added in the soil. The biodegradable plastic-based product undergoes biodegradation to treat the soil. The operating conditions are identical to those of the preferred embodiment.

The method of treatment illustrated in flow diagram 3 and as shown in FIG. 3 starts with step S21 where a biodegradable plastic-based product is added in the soil formed by melt blending, dry blending or compounding an amount of fine mineral matter with particle sizes ranging from less than about 50 μm to about 2 μm and a non-biodegradable plastic-based product.

In step S22, biodegradable plastic in soil undergoes biodegradation. The biodegradation process can be accelerated by inclusion of known microbial nutrients, e.g. poly (hydroxyalkanoates), starches, proteins, which could sustain the plastics conversion process. The extent of biodegradation would also depend on the completeness of the oxidative degradation process and soil conditions (moisture, pH, composition, temperature). The biodegradation process releases the transition metals in step S23. The released transition metals get bio assimilated in the soil in step S24 to increase the nutrient availability in soil.

Figure 4:
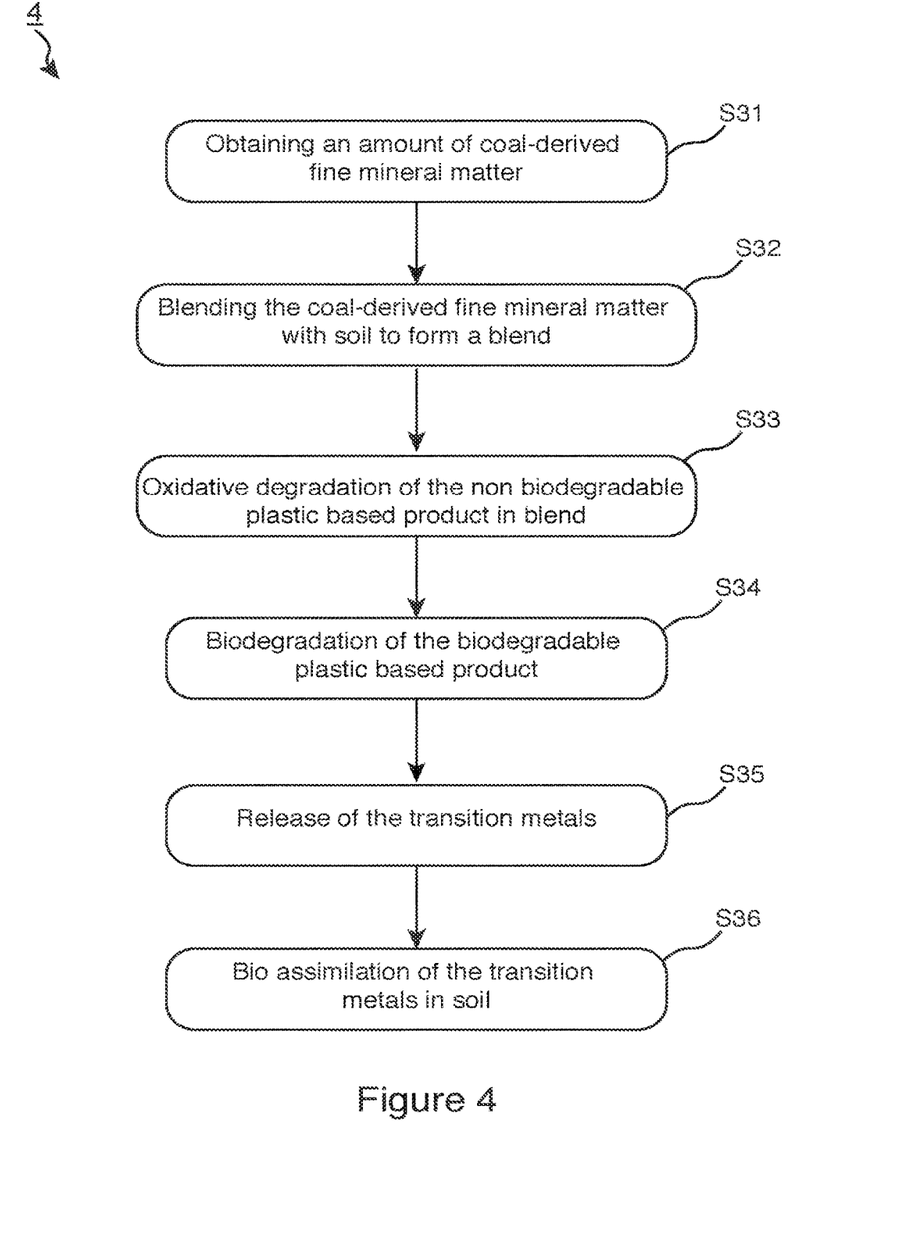
FIG. 4 represents a flow diagram illustrating the method for remediation of soil according to another embodiment of the presently disclosed embodiments.

In another embodiment shown in FIG. 4, a flow diagram 4 of a method for remediation of soil is described. A non-biodegradable plastic-based product in soil is converted into a biodegradable plastic-based product and undergoes biodegradation and releases biomass and useful micronutrients to remove plastic pollutants and remediate the soil. The operating conditions are identical to those of the preferred embodiment.

The method for remediation illustrated in flow diagram 4 and as shown in FIG. 4 starts with step S31 where an amount of the fine mineral matter with particle sizes ranging from less than about 2 μm to greater than about 500 μm, and in some embodiments, from about 2 μm to about 200 μm is obtained. The fine mineral matter comprises the transition metal from the group of Fe, Cu, Mn, Mo, Zn, Co, or combinations thereof to cause the oxidative degradation of the non-biodegradable plastic in soil. The transition metals in the fine mineral matter have concentrations defined in the range shown in Table 2.

The fine mineral matter further comprises a promoter from the list consisting of Ca, K, Mg, or combinations thereof. The promoter in the fine mineral matter has concentrations defined in the range shown in the Table 3.

In step S32, the fine mineral matter is added to the soil directly. The blending is done preferably with a rototiller or equivalent device to achieve a homogeneous dispersion. A few rototilling soil treatments are done to promote better dispersion of the fine mineral matter in soil.

In step S33, the non-biodegradable plastic-based product in the blend undergoes oxidative degradation. The transition metals in the fine mineral matter act as pro-oxidants and cause oxidative degradation of the non-biodegradable plastic-based product to convert the non-biodegradable plastic-based product into the biodegradable plastic-based product according to Reactions 1, Reactions 2 and Reactions 3 described above. The promoters in the fine mineral matter further promotes the oxidative degradation of the non-biodegradable plastic-based product into the biodegradable plastic-based product in soil.

The non-biodegradable plastic in step S33 is a polyolefin-based plastic such as LDPE, HDPE, LLDPE, PP and their copolymers and mixtures. Some additional non-limiting examples of hydrocarbon-based plastics can include, polybutenes, polymethylpentenes, polystyrene, styrene/acrylonitrile copolymers, acrylonitrile/butadiene/styrene terpolymers, acrylate/styrene/acrylonitrile terpolymers, sterene/butadiene/styrene and styrene/isoprene/styrene copolymers, acrylic, vinyl based polymers, polycarbonates, and their mixtures and copolymers. In addition, polyesters, polyethers, polyether esters, polyurethanes, and polyacetals, polyisoprene, polybutadiene, polyvinyl alcohol, polyvinyl acetate, copolymers of vinyl alcohol and vinyl acetate, copolymers of ethylene and vinyl acetate, polyvinyl chloride, methacrylate/butadiene/styrene copolymers, thermoplastic polyurethane elastomers, and/or polyester elastomers.

In step S34, biodegradable plastic-based product in soil undergoes biodegradation. The biodegradation process can be accelerated by inclusion of known microbial nutrients, e.g., poly(hydroxyalkanoates), starches, proteins, which could sustain the plastic conversion process. The extent of biodegradation would also depend on the completeness of the oxidative degradation process and soil conditions (moisture, pH, composition, temperature). The biodegradation process releases the transition metals in step S35. The released transition metals get bio assimilated in the soil in step S36 to increase the nutrient availability in the soil. The bio assimilation of the transition metals improves the soil quality and contributes to healthier plants and better soil fertility that has been reduced with time.

In another embodiment, the fine mineral matter includes a transition metal from the group of Fe, Cu, Mn, Mo, Zn, Co, or combinations thereof at the following concentrations:
Fe 14,000 to 55,000 ppm, though in some embodiments can range from 14,000 to 45,000 ppm;
Cu 10 to 90 ppm, though in some embodiments can range from 10 to 50 ppm;
Mn 100 to 1300 ppm, though in some embodiments can range from 100 to 700 ppm;
Mo 1 to 2 ppm;
Zn 20 to 500 ppm though in some embodiments can range from 20 to 120 ppm; and
Co 10 to 15 ppm;
wherein ppm are measured with ICP-AES method utilizing nitric acid, hydrochloric acid and hydrogen peroxide in a heated digester.

In another embodiment, the fine mineral matter contains a promoter from the group of Ca, K, Mg or combinations thereof at the following concentrations:
Ca 1,000 to 300,000 ppm though in some embodiments can range from 1,000 to 28,000 ppm, and/or embodiments can range from 1,000 to 18,000 ppm;
K 600 to 4,000 ppm;
Mg 20 to 12,000 ppm, though in some embodiments can range from 20 to 8,000 ppm; and
alkaline/alkaline earth promoters; and carboxylic acids and/or amine promoters. In another embodiment, the fine mineral matter further contains at least one additive from the group of antioxidants, pigments, IR absorbers, lubricants, unsaturated organic compounds, substituted benzophenones, peroxides, biodegradable plasticizers, waxes, UV and thermal stabilizers, biodegradable polymers and oligomers, or combinations thereof, wherein the antioxidants are used to inhibit oxidative degradation of plastics. In another embodiment, the concentration of the fine mineral matter in final products ranges from about 0.1 to about 3 wt. %. In another embodiment, the fine mineral matter is added to the non-biodegradable plastic via masterbatches or concentrates to achieve homogeneous dispersion, wherein the concentrations of the mineral matter particles in the masterbatches are in the range of about 3 to about 50 wt. %.

The utilization of fine mineral matter also reduces water contamination that may be caused when the coal refuse is discarded as waste and is washed down in the ravines, rivers, lakes, seas, etc. The embodiments described herein are simple, easy, economical, environment friendly and efficient in converting the non-biodegradable plastic into the biodegradable plastic.

From the foregoing disclosure and detailed description of certain embodiments, it is apparent that various modifications, additions and other alternative embodiments are possible without departing from the true scope and spirit of the present embodiments. The embodiments discussed were chosen and described to provide the best illustration of the principles of the present embodiments and their practical applications to enable one of ordinary skill in the art to utilize the various embodiments and with various modifications as are suitable to the particular use contemplated. All such modifications and variations are within the scope of the present embodiments as determined by the appended claims when interpreted in accordance with the benefit to which they are fairly, legally, and equitably entitled.

The invention claimed is:

1. A method of converting a non-biodegradable plastic into a biodegradable plastic comprising:
obtaining an amount of carbon-free fine mineral matter derived from coal and/or mined from natural resources including volcanic basalt, glacial rock dust deposits, iron potassium silicate and/or sea shore deposits with particle sizes ranging from less than about 50 μm to about 2 μm; and
melt blending, dry blending, or compounding the fine mineral matter with the non-biodegradable plastic to convert the non-biodegradable plastic into the biodegradable plastic product.

2. The method according to claim 1, wherein the non-biodegradable plastic is a hydrocarbon based polymer selected from the list consisting of polybutenes, polymethylpentenes, polystyrene, styrene/acrylonitrile copolymers, acrylonitrile/butadiene/styrene terpolymers, acrylate/styrene/acrylonitrile terpolymers, sterene/butadiene/styrene and styrene/isoprene/styrene copolymers, acrylic, vinyl based polymers, polycarbonates, and their mixtures and copolymers, polyesters, polyethers, polyether esters, polyurethanes, polyacetals, polyisoprene, polybutadiene, polyvinyl alcohol, polyvinyl acetate, copolymers of vinyl alcohol and vinyl acetate, copolymers of ethylene and vinyl acetate, polyvinyl chloride, methacrylate/butadiene/styrene copolymers, thermoplastic polyurethane elastomers, or polyester elastomers.

3. The method according to claim 1, wherein the fine mineral matter comprises at least one transition metal selected from the group consisting of Fe, Cu, Mn, Mo, Zn, Co or combinations thereof at the following concentrations:
Fe 14,000 to 55,000 ppm;
Cu 10 to 90 ppm;
Mn 100 to 1300 ppm;
Mo 1 to 2 ppm;
Zn 20 to 500 ppm; and
Co 10 to 15 ppm;
wherein ppm are measured with ICP-AES method utilizing nitric acid, hydrochloric acid and hydrogen peroxide in a heated digester.

4. The method according to claim 1, wherein the fine mineral matter comprises of a promoter selected from the alkaline/alkaline earth group consisting of Ca, K, Mg or combinations thereof at the following concentrations:
Ca 1,000 to 300,000 ppm;
K 600 to 4,000 ppm;
Mg 20 to 12,000 ppm; and/or other acidic or amine promoters.

5. The method according to claim 1, wherein the biodegradable plastic can be converted into at least one of a film, a sheet, a fiber, a filament, or a molded form, or combinations thereof.

6. The method according to claim 1, wherein the conversion occurs in soil.

7. The method according to claim 1, wherein the conversion occurs in a fresh water or marine environment.

8. The method according to claim 1, wherein the fine mineral matter is sourced from different minerals including phyllosilicates, clays, sulfide minerals, phosphate minerals, aluminum (bauxite) tailings and their mixtures to obtain required composition and metals ratio.

9. The method according to claim 1, wherein the fine mineral matter particles are embedded on or mixed with organic or inorganic salts of transition metals and alkali/alkaline earth metals to enhance biodegradation performance.

10. The method according to claim 1, wherein the fine mineral matter is mixed with transition metal-based pigments to simultaneously provide the color and catalyze the biodegradation.

11. The method according to claim 1, wherein the fine mineral matter is further sourced from phytomined or synthetic alternatives of geologic minerals.

* * * * *